May 19, 1936.  H. J. REITER  2,041,514
RADIATOR COVER CLIP
Filed Oct. 29, 1935
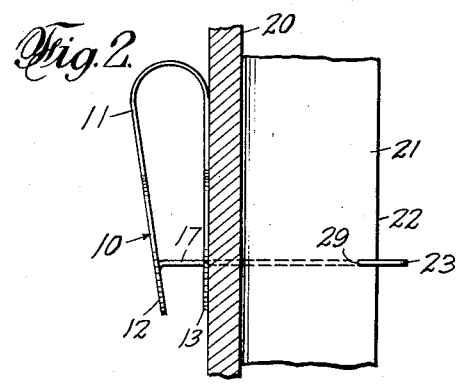
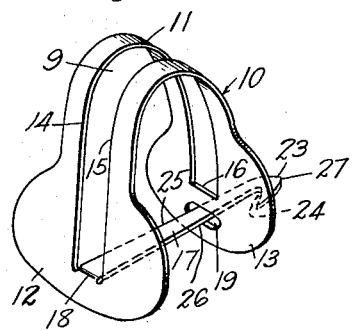
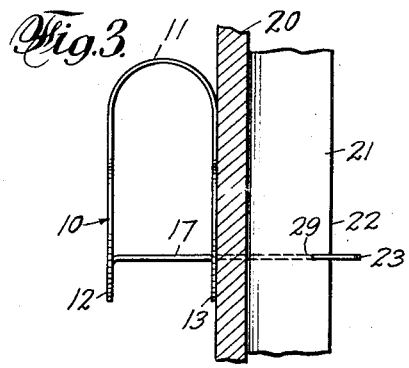
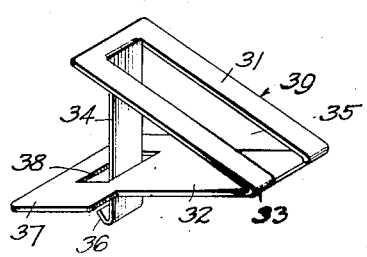
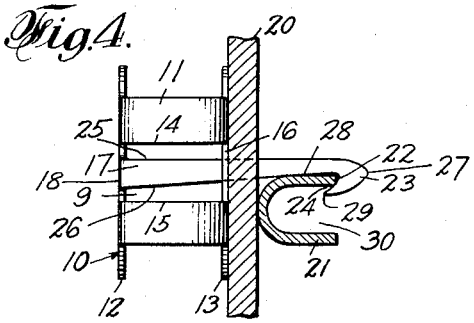
INVENTOR
Harold J. Reiter
BY
ATTORNEY Patented May 19, 1936

2,041,514

UNITED STATES PATENT OFFICE 2,041,514

RADIATOR COVER CLIP

Harold J. Reiter, Chicago, Ill.

Application October 29, 1935, Serial No. 47,219

14 Claims. (Cl. 24—259)

This invention relates to spring clips for holding a flexible cover on to the grill bars of an automobile radiator, and is an improvement of the clip disclosed in the co-pending application of Lues Reiter for patent for One-piece automobile-radiator-cover clip, filed October 7th, 1935, Serial No. 43,846.

My invention contemplates the provision of a simple and inexpensive clip which is sufficiently yieldable and hence self-adjusting to fit and engage grill bars of all the various shapes and sizes now in use and which adequately and efficiently secures the cover in its proper place, and to form which, less material is used than in the clip shown in said co-pending application.

My invention further contemplates the provision of a clip provided with a spring loop and with a grill bar-engaging tongue, which tongue is cut and bent from the material of the loop.

The various objects of my invention will be clear from the description which follows and from the drawing in which, Fig. 1 is a perspective view of my improved clip.

Fig. 2 is a side elevation thereof as it appears in its operative position, holding an automobile cover to a comparatively wide grill bar.

Fig. 3 is a similar view of the same showing the clip, however, used in connection with a comparatively narrow grill bar.

Fig. 4 is a top plan view of the same.

Fig. 5 is a perspective view of a modified form of my improved clip wherein the radius of the loop arc is reduced to a minimum, and the hook is bent from the end of the tongue member instead of being cut therein.

In that practical embodiment of my invention which I have shown by way of example, it is intended that the clip, designated generally by the numeral 10, be used for securing the automobile radiator cover 20 to the grill bars 21 regardless of the shapes or sizes of said bars, said bars being customarily arranged at the front of an automobile radiator.

I prefer to make the clip 10 of a single piece of suitable springy sheet metal such as brass, steel or the like. The general form of the clip 10 is P-shaped or that of an open loop terminating in spaced free ends, a relatively straight cross piece extending laterally across the loop and past one of the ends. The spring loop 11 terminates at its front end in the preferably enlarged thumb piece 12, and at its rear end in the similarly enlarged finger piece and radiator cover-engaging member 13. The loop portion 11 integrally connects the members 12 and 13 and is provided with a longitudinal slot 9 formed by a pair of preferably parallel cuts 14, 15 and a third cut 16 perpendicular to and joining the ends of the cuts 14 and 15. The piece of material thus cut or partly severed from the loop portion 11 and from the central parts of the members 12 and 13 is used to form the grill-bar-engaging tongue 17. The slot 9 divides the major part of the spring loop 11 into two similar U-shaped and transversely spaced parts separated by the slot and integrally joined at their front ends by the web 12 forming the front thumb piece, and integrally joined at their rear ends by the web 13. Said tongue 17 is integrally joined to and bent from and at substantially right angles to the member 12 at the front end 18 of the slot 9. The member 17 is preferably flat and of sufficient length to pass through the slot 19 of the member 13, said slot 19 being arranged substantially parallel to and below the slot end or cut 16 and being of sufficient width and height to permit the ready passage of the tongue 17 therethrough. The length of the member 17 is such that when the members 12 and 13 are brought as near to each other as possible, the free end portion of the member 17 projects rearwardly through the slot 19 a sufficient distance to engage the rear edge 22 of a grill bar of the greatest width. Preferably, the member 17 terminates in a hook 23 provided with a recess 24 in which the edge portion of the grill bar is received (Fig. 4).

Normally, the spring action of the loop 11 urges the members 12 and 13 apart and thereby tends to draw the hook 23 forwardly and thereby holds the clip and the radiator cover interposed between the lop 11 and the grill bar in place. The clip may readily be stamped from a sheet of metal in one operation, the slot 9 being simultaneously formed and the periphery of the member 17 being simultaneously shaped along its edges 25 and 26 and the hook 23 and recess 24 all made at the same time.

It will be understood that the radiator cover 20 may be provided with suitable grommets or eyelets in a manner well known in the art, or that such eyelets or grommets may be entirely omitted if desired.

In any event, it is intended that the hook portion 23 of the clip be passed either through the eyelet in the cover 20 or through the material of the cover itself. Preferably, after the cover has been arranged in its proper position in front of the grill bars, the entire clip is positioned in front of the cover and the hook 23 then passed through either the eyelet or through the material of the cover into the position in which the clip is intended to be finally arranged relatively to the cover.

The pointed end 27 of the hook 23 pierces the material of the cover where no eyelet is provided and slides along one of the faces as 28 of the grill bar until the hook end 29 passes the extreme inner edge 22 of the grill bar.

During the operation of pushing the hook through the cover, it will be understood that said hook has first been passed through the slot 19 and that the rear member 13 may be grasped by two fingers of the user or may be rested directly against the front face of the cover. The thumb of the user rests against and exerts pressure upon the thumb piece 12. As the members 12 and 13 are thus pressed together, the loop portion 11 is stressed and distorted so that when said members are released, said loop separates the members 12 and 13 and draws the hook of the member 17 into the recess 30 of the grill bar and into the position shown in Figs. 2, 3 and 4. The clip is thereby secured to the cover and the cover secured to the grill bar.

To remove the cover, the operation is reversed; that is, the member 12 is pushed inwardly or rearwardly a sufficient distance to remove the hook from the grill bar edge 22 after which the clip together with the flexible cover are moved transversely a sufficient amount to cause the hook to pass outside of the surface 28, thereby releasing the clip from the grill bar and releasing the cover.

It will be seen that by cutting the tongue member 17 from the material of the loop itself, a considerable saving in material is effected without loss of efficiency of the clip.

In that form of my invention shown in Fig. 5, the clip 39 is made of a single piece of material bent on itself to form the substantially flat loop parts 31 and 32. The loop bend 33 integrally joining the parts 31 and 32 is of as little radius as possible, so that said parts may come as close together as possible when the clip is operative. The substantially rectangular tongue 34 is made from material removed from the part 31. Such removal of material leaves the slot 35 in said part. At its free end, the hook 36 is bent laterally from the remainder of the tongue 34, in distinction from the showing of Figs. 1 and 4, wherein the tongue 17 is cut to form the hook 23.

The part 32 is preferably widened at its free end as at 37 and there provided with a slot 38 for the reception and passage of the tongue 34. In use, the clip is arranged vertically with its longest dimension horizontal and the hook 36 in position to enter the recess 30 of a grill bar. The tongue 34, however, is preferably passed through a grommet or eyelet in the radiator cover 20 instead of being forced through the material of the cover.

It will also be seen that I have provided a universal one-piece clip requiring a minimum amount of material in its formation, and adapted automatically to adjust itself into position to securely hold an automobile radiator cover to a radiator grill bar regardless of the shape or size of said bar.

While I have shown and described a certain specific embodiment of my invention, I do not desire to limit myself thereto but intend to claim my invention as broadly as may be permitted by the state of the prior art and the scope of the appended claims.

I claim:

1. A one-piece sheet metal clip to engage a grill bar of an automobile radiator to hold a flexible radiator cover to the bar comprising a spring loop portion terminating in a pair of free ends and provided with a rear slot, and an elongated longitudinal slot, said loop portion being adapted for arrangement on one side of said cover, and a flat tongue adapted to pass through said cover and integrally joined at one end thereof to said portion at an end of the longitudinal slot and terminating in a hook entering the rear slot and of less width than that of the rear slot and adapted to slide in the rear slot on the movement of said free ends toward and from each other, the length of said tongue being a major fraction of the length of the longitudinal slot, said loop portion retracting the tongue automatically until further retraction of the tongue is prevented by the engagement of the hook with a grill bar in its path, said loop portion being adapted to hold the cover against the grill bar.

2. A one-piece clip in the form of a spring loop variable in width and provided with a tongue-receiving slot and a longitudinal slot, and a hooked tongue extending integrally from the material forming the loop and at one end of the longitudinal slot and arranged to pass through the tongue-receiving slot, said tongue being at least as long as half the loop, and being urged by said loop in a direction to withdraw it from the tongue-receiving slot.

3. A one-piece sheet metal clip provided with a slot and with a spring portion, and a hook extending angularly from and intermediate the ends of the spring portion into position to enter the slot, said spring portion automatically urging said hook in a direction to withdraw it from the slot unless said spring portion is fully extended.

4. A clip provided with a slotted spring portion and with a hooked securing tongue integral with and extending from the material of the spring portion and passing through the slot thereof, said tongue being adapted to engage an article arranged beyond the spring portion and being urged by said spring portion in a direction to withdraw the tongue from the slot when the clip is operative.

5. A one-piece sheet metal clip comprising a first slotted part, a second slotted part extending integrally from the first slotted part, and forming a spring loop therewith and a tongue terminating in a hook, said tongue extending from an end of the slot of one of said slotted parts and passing through the slot of the other part, both of said slotted parts being adapted for arrangement on one side of a sheet of material, and the hook being adapted to engage another article adjacent the sheet whereby the sheet is held to said other article by the clip under the spring action of said loop.

6. A clip of sheet material comprising a U-shaped spring portion extending between the end parts of the spring portion, said securing portion being integrally joined at one end to a part of the spring portion intermediate the ends of said spring portion, said spring portion, when aperative, being arranged on one side of a sheet with the securing portion passing completely through and extending beyond the sheet into position to engage another article and thereby to put the spring portion under stress tending to retract the securing portion and to clamp the sheet against the article.

7. In a one-piece clip for use in holding an automobile radiator cover to the grill bars of an automobile radiator, a U-shaped spring portion comprising a pair of similar transversely spaced U-shaped parts joined by a web at each of the ends of said parts, and a grill bar-engaging member extending between said parts, and integrally joined at one end to and extending angularly from an inner edge of one of said webs, and extending laterally past the other web in the fully extended position of said spring portion.

8. In a one-piece clip of the character described, a bent spring portion having a longitudinal slot therein to form a pair of similar transversely spaced members integrally joined at their extremities, and a tongue terminating at its free end in a hook, said tongue comprising the material removed from the spring portion to form said slot, and said tongue extending from one end of the slot toward the other end thereof, said pair of members, when said spring portion is compressed and arranged on one side of a sheet with the tongue passing through the sheet and engaging another article, being urged apart by said spring portion to carry the hook into engagement with said article and thereby to clamp the sheet against said article.

9. In a one-piece clip, a spring portion provided with a longitudinal slot and with a transverse slot beyond the longitudinal slot, said spring portion being adapted to be arranged on the outside of an automobile radiator cover, a hooked tongue extending angularly from an end of the longitudinal slot and passing through the transverse slot and adapted when the spring portion is compressed to pass through the cover into engagement with a grill bar, said spring portion when compressed against said cover to extend the tongue, urging said cover against the grill bar.

10. In a one-piece clip, an arcuate spring portion having a longitudinal slot therein and a transverse slot beyond the end of the longitudinal slot, a hooked tongue extending angularly from the other end of the longitudinal slot in a direction to pass through the transverse slot when the arcuate spring portion is compressed, said tongue being of sufficient length to grip the remote edge of a grill bar of an automobile radiator arranged beyond the spring portion, part of said spring portion serving as a washer to press against a sheet interposed between the grill bar and said part.

11. In a one-piece spring clip, a tongue-carrying portion, a washer portion having a tongue-receiving slot therein and integrally joined to the tongue-carrying portion and forming an arcuate spring therewith, said portions having a longitudinal slot therein, a tongue extending from the tongue-carrying portion at an end of the longitudinal slot and of sufficient length to pass through the tongue-receiving slot when said portions are drawn together to compress the spring, and a hook on the tongue adapted to engage the remote edge of an automobile radiator grill bar arranged beyond said portions and in the path of the hook to maintain the spring in its compressed state and to press said washer portion against any material interposed between the washer portion and the grill bar.

12. A one-piece sheet metal spring clip for use in holding an automobile-radiator-cover to the grill bar of an automobile radiator, comprising a spring loop having a longitudinal slot therein, an enlarged thumb piece at one end of the spring loop, an enlarged washer piece at the other end of the loop and having a tongue-receiving slot therein, and a tongue provided with a hook movable through the tongue-receiving slot in either direction on the compression and release of the spring loop, said tongue extending from the thumb piece at an end of the longitudinal slot and being adapted to pass through the cover into position wherein the hook engages the grill bar irrespective of the width and shape of the bar and the cover is pressed by the washer piece against the grill bar.

13. In an installation for removably securing an automobile radiator cover to the grill bars of an automobile radiator, a one-piece sheet metal clip having a longitudinally slotted U-shaped spring portion comprising a tongue-carrying side and a washer side provided with a second slot and a hooked tongue projecting from the tongue-carrying side at the end of the longitudinal slot and passing through said second slot, said clip being arranged with the entire spring portion thereof on one side of the cover and with the washer side in contact with and pressing the cover against the front of the grill bars, and the tongue passing through the cover with the hook thereof hooked on the remote edge of a grill bar and thereby holding the cover to the grill bar.

14. In an automobile radiator cover installation, the combination with the grill bars of an automobile radiator, of a flexible cover therefor, and means for removably holding the cover to the grill bars regardless of the widths of said bars comprising a one-piece clip provided with a spring portion, said portion having a central slot throughout the length thereof except at its ends and having a transverse slot at one end, and a tongue integral with the clip and extending angularly from the end of the longitudinal slot through the transverse slot, said tongue passing through the cover and terminating in a hook engaging a grill bar, said spring portion being arranged on one side of the cover and the grill bars on the other side of the cover, and said spring portion retracting said hook into engagement with the grill bar and urging said cover against the grill bar.

HAROLD J. REITER.